United States Patent
Kondapally et al.

(10) Patent No.: US 8,233,381 B1
(45) Date of Patent: Jul. 31, 2012

(54) VOIP TELEPHONE SYSTEM WITH DISTRIBUTED ACCOUNT CODES

(75) Inventors: Mamata Kondapally, Fremont, CA (US); Scott A. Van Gundy, Los Gatos, CA (US)

(73) Assignee: Shoretel, Inc., Sunnyvale, CA (US)

( * ) Notice: Subject to any disclaimer, the term of this patent is extended or adjusted under 35 U.S.C. 154(b) by 158 days.

(21) Appl. No.: 12/342,558

(22) Filed: Dec. 23, 2008

(51) Int. Cl.
| | |
|---|---|
| G01R 31/08 | (2006.01) |
| G06F 11/00 | (2006.01) |
| G08C 15/00 | (2006.01) |
| H04J 1/16 | (2006.01) |
| H04J 3/14 | (2006.01) |
| H04L 1/00 | (2006.01) |
| H04L 12/26 | (2006.01) |
| H04L 12/66 | (2006.01) |
| H04L 12/50 | (2006.01) |
| H04L 12/28 | (2006.01) |
| H04L 12/56 | (2006.01) |
| H04W 4/00 | (2009.01) |
| H04Q 11/00 | (2006.01) |
| H04J 3/16 | (2006.01) |
| H04J 3/22 | (2006.01) |
| H04J 1/14 | (2006.01) |
| H04J 1/02 | (2006.01) |
| H04M 1/64 | (2006.01) |

(52) U.S. Cl. ........ 370/219; 370/220; 370/329; 370/353; 370/354; 370/356; 370/358; 370/385; 370/389; 370/395.2; 370/395.3; 370/401; 370/422; 370/437; 370/467; 370/497; 379/67.1; 379/88.12

(58) Field of Classification Search ........................ None
See application file for complete search history.

(56) References Cited

U.S. PATENT DOCUMENTS

| | | | |
|---|---|---|---|
| 6,526,043 B1 * | 2/2003 | Fogelholm et al. | ........... 370/352 |
| 7,450,574 B1 | 11/2008 | Miller et al. | |
| 7,450,703 B1 | 11/2008 | Tovino | |
| 7,653,932 B2 * | 1/2010 | Arnold et al. | ...................... 726/3 |
| 2007/0060097 A1 * | 3/2007 | Edge et al. | .................. 455/404.1 |
| 2007/0211868 A1 * | 9/2007 | Banda et al. | .................. 379/67.1 |
| 2008/0205603 A1 * | 8/2008 | Allison et al. | ............. 379/88.12 |

* cited by examiner

Primary Examiner — Nishant B Divecha
(74) Attorney, Agent, or Firm — Kilpatrick Townsend & Stockton LLP

(57) ABSTRACT

A voice over internet protocol telephone system is described in which services for handling calls invoking account codes are distributed to voicemail servers in the system. If the voicemail server associated with a particular user does not have services for handling account code calls, then the request is forwarded to another voicemail server in accordance with a predefined procedure.

15 Claims, 2 Drawing Sheets

VOIP TELEPHONE SYSTEM WITH DISTRIBUTED ACCOUNT CODES

BACKGROUND OF THE INVENTION

Voice over Internet Protocol (VoIP) involves the routing of voice conversations over the internet using a telephone employing VoIP technology, e.g. a VoIP protocol. VoIP provides a secure approach to communications by making use of encryption and authentication protocols. Most of the difficulties of creating a secure communication over traditional telephone lines, such as digital transmission, are already in place with VoIP. VoIP allows use of regular telephone networks anywhere through any internet service provider, and avoids long distance charges. VoIP facilitates reduction of telephony costs by enabling communication over data network cables. Although VoIP requires those using it to have a network and be connected to the internet, this is rarely a problem in today's commercial businesses. Skype and Vonage are examples of VoIP being utilized world wide. Voice-over-IP systems carry telephony signals as digital audio, typically reduced in data rate using speech data compression techniques, encapsulated in a data-packet stream over IP.

VoIP networks are now increasingly used as alternatives to the Public-Switched Telephone Network (PSTN). VoIP allows companies to extend communication services to all employees, whether they are in an office headquarters, branch office, working at home, or even mobile. Because they are primarily software based, VoIP systems are highly scalable. A typical VoIP system, for example, as provided by ShoreTel, the assignee of this invention, is capable of providing telephony services from one user to large numbers of users, e.g., 10,000 users. VoIP is particularly advantageous for fast growing companies, or companies where fast response to changes in telephony demand is important.

One benefit of being software based is that VoIP systems can include, at no additional charge, features for which communications companies using the public switched telephone network normally charge extra. For example, VoIP can provide three-way calling, call forwarding, automatic redial, caller ID, etc. Some VoIP providers offer a "soft" client which allows a user to control calls from a desktop computer.

One feature often desired in VoIP systems is the handling of account codes. Account codes allow a system administrator to restrict calls, or account for calls, to outbound external numbers. In some systems, account codes are referred to as authorization codes, accounting codes, billing codes, or other similar terminology. In some systems the accounting code, when not used as an authorization code, can be added during or after the call. This is achieved by having the user of the telephone enter a valid account code at the time a call is made. Entry of an account code to make a call, for example an international call, can be required or optional, depending upon settings made by the system administrator when the telephone system is configured.

Whether the account code is required or optional, after the information is collected it can be added to records of the calls made to enable the making of reports identifying the purpose, duration, client name, or other information. This compiled data may be useful for accounting purposes, such as allocating employees time to various different projects. It also enables reports to be generated, identifying which account was worked on by which user at any particular time or date.

In typical prior art systems, for example, as implemented by the assignee of this invention, the account code service runs only on a headquarters server. All outbound calls for users which are in a user group invoking account codes are then directed to the headquarters server, regardless of the site where the user originates the call. After the headquarters server extracts the account code information, it forwards the call on to the target destination.

Handling the account code feature in this manner is undesirable. It results in directing a large amount of telephone traffic across the network to the headquarters server, placing extra load on that server. Furthermore, in the event of a server or network failure, users are either unable to make calls requiring account codes, or those codes are not saved and provided to the proper units for further data management.

Accordingly, there is a general need for an improved method and apparatus for handling account codes when calls are processed using a VoIP system.

BRIEF SUMMARY OF THE INVENTION

This invention overcomes the problems associated with centralized handling of account codes by a headquarters server. The invention provides a technique for distributing the collection of account codes throughout a large telephone communication system in accordance with an administrator's preferences. In particular, the invention enables distribution of the account code service across different servers, switches, and other infrastructure at will. The administrator can then add or remove a server from the distribution list without impacting the account code related calls. Enabling the administrator to have control over which servers, switches, voicemail servers, etc. provide the account code service allows the administrator to keep the account codes off the switches or servers that do not have the necessary capabilities, such as memory or CPU resources.

In one embodiment, all calls requiring account codes are sent to the voicemail server associated with the user placing the call. The voicemail servers typically have sufficient CPU and memory capacity to accept the additional load imposed by the handling of account code calls. If the voicemail server for the particular user making the call is not in the account code server distribution list configured by the administrator, then the call may be directed to another voicemail server according to the hierarchy of the particular site where the user is situated. Furthermore, in the event of a user's voicemail server being unavailable, for example as a result of a failure, the account code call is directed to the next available voicemail server in the hierarchy. If enough voicemail servers are not available, then the call can be distributed back to the headquarters server or a backup server.

In one implementation of this invention, when a user makes a telephone call requiring an account code, the system determines if the voicemail server for that group of users with which the user making the call is associated has the services for handling calls requiring account codes. If the voicemail server for that user has services for handling account code calls, then that voicemail server handles the user's call. On the other hand, if the voicemail server for that user does not have services for handling account code calls, it transfers responsibility for at least the account code aspects of the call to another server, typically one in the hierarchy of voicemail servers. Once that server, or in the event of a failure of that server, the headquarters server or other designated backup server, handles the account code aspects of the telephone call, then that server transfers responsibility for other aspects of the call, including connecting the call, to the appropriate server and switch.

DETAILED DESCRIPTION OF THE INVENTION

Figure 1:
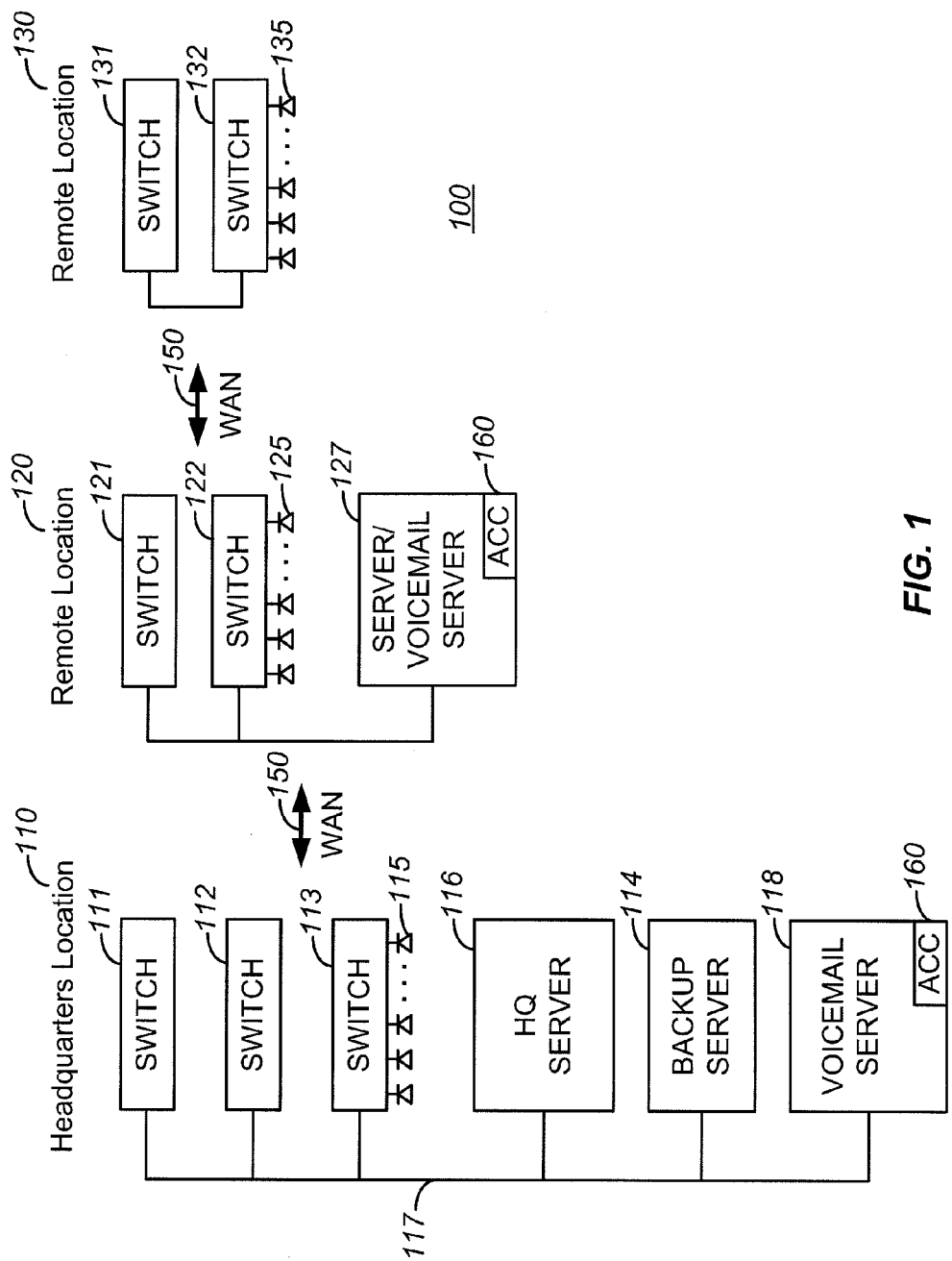
FIG. 1 is a block diagram of a VoIP system according to one embodiment of the invention.

FIG. 1 is a block diagram of a VoIP system according to an embodiment of the present invention. In the example of FIG. 1, the VoIP system 100 is deployed in three different locations, the headquarters location 110, a first remote location 120, and a second remote location 130. As will be apparent from the description below, as many locations as desired may be included in the system, limited only by the capacity of the particular hardware chosen for implementation. The locations 110, 120, and 130 communicate with each other over a wide area network 150. Typically, network 150 includes the internet, although other types of communications network also may be employed. One skilled in the art will appreciate that the illustrated sites can be physically distinct from each other, or merely topology-related groupings, that are not in physically distinct locations.

The portion of the system situated at the headquarters location includes several switches 111, 112, and 113. User telephones 115 are connected to each switch, such as illustrated for switch 113. (Telephones for other switches 111, 112, 121 and 131 are not illustrated.) The switches are used to route telephone calls from telephone to telephone, both internally within location 110, and externally from location 110 to locations 120 or 130, as well as from any location in FIG. 1 to the public switched telephone network or any otherwise accessible telephone. Location 110 also includes a headquarters server 116, a voicemail server 118, and a backup server 114. The voicemail function may be implemented in any desired manner, e.g. by a separate system, in a separate server, or in the headquarters server. If implemented as a separate server, the voicemail server 118 provides voicemail services to the users in headquarters location 110, e.g., the storing and replaying of telephone messages received by users coupled to the switches and LAN at location 110. Generally the switches, servers, and telephones are coupled via the LAN 117. Also generally, the services for the various telephones at location 110 are provided by the switches to which each is coupled. For example, such services include all the conventional, now well known VoIP telephone services including redial, call forwarding, transfer of calls, etc.

In FIG. 1, although the servers and switches are shown as separate units, it will be apparent to those of ordinary skill that these units need not be separate. For example, server 116 and switch 111 may be combined into a single unit which provides both functionalities. In addition, although characterized as servers, units of other types, for example, call processing servers, media gateways, and embedded servers may be used.

At the first remote location 120, for illustrative purposes, a slightly different configuration of the system has been installed. At this location a smaller number of users necessitates only two switches 121 and 122; however, the telephones 125 are connected to the switches in the same manner as at the headquarters location 110. Remote location 120 includes a combined server/voicemail server 127 to provide various services for the users of the telephone system at that location.

At a third location 130, yet a smaller system is illustrated, consisting of only two switches 131 and 132 coupled to telephones 135, in a similar manner as with respect to the rest of the figure. The reduced number of users at location 130 enables the services for their telephone calls to be provided by a server located elsewhere, e.g., server 127 at location 120. In other words, all services for telephone calls made at location 130 are handled by the server 127 at location 120.

Many VoIP telephone systems include an account code feature. The account code feature allows a system administrator to restrict calls to outbound external numbers unless a valid account code (also known as an accounting code, billing number, tracking number, etc,) has been entered into the telephone system. For example, after the user dials a particular telephone number, the system can determine whether that call fits within the permitted uses of the telephone for that user. If the call is, for example, overseas, the system may require the user to enter an account code before completing the call. The account code is typically a string of digits which indicate that either the user has permission to make the call, or carries with it accounting information, for example, to allocate long distance telephone costs, or user time, among particular projects. The account codes can be established by the system administrator as either optional or required. If they are required, the call cannot be completed without a valid account code. If they are optional, the call will go through, and if an account code has been entered, information about the call will be tracked.

Typically, the information about the calls and the account codes is collected in a database and provided back to the manager of the system, or the various users, depending upon permissions established by the system administrator. For example, different users of the system may have different permissions to make international calls, with data about the duration and destination of the call being recorded for some, but not for others. The voicemail servers 118 and 127 are each configured to handle account codes 160, and this feature is discussed in further detail below.

According to the present invention, the implementation of the account code feature is distributed throughout the system, rather than being placed in a central location. By distributing the account code service across different servers, the administrators are able to add or remove a server from a distribution list at will without affecting the calls. In addition, distributing the account code feature across the system enables the system administrator to keep the account feature away from those switches or servers that do not have the necessary processing or memory capacity.

In one embodiment of our invention, the account code service is distributed to the voicemail servers. This implementation is shown in FIG. 1. Typically, the system administrator will have established groups of users where certain calls, for example to selected telephone numbers or area codes, require account codes. There the account code service 160 is associated with the voicemail server 118 and 127. The operation of the account code service is as follows. Assume a call is placed from one of telephones 115. When this outbound call invokes the account code service, switch 113 will route the call to the account code extension, a special extension number defined by the system administrator. Account code service 160 in voicemail server 118 then validates the account code and transfers the call to the destination.

Assuming the system administrator has configured the system to make entry of the account code mandatory, without that account code, the switch 113 will not complete the call. Alternately if the account code is optional, the call may be completed without the account code information. If the account code is provided, then the account code service 160 validates the code before forwarding the call on to the destination.

As illustrated for the configuration shown in FIG. 1, the account code services has been added to the voicemail servers. These voicemail servers 118, 127 are typically distributed throughout the network in close proximity to the users. The voicemail servers are required to be relatively powerful servers with sufficient storage capacity to store large numbers of telephone messages. For this reason they typically have sufficient processing power and memory to provide capability for the account code feature. In this implementation the local account code extension is monitored by the voicemail service on the voicemail servers. Upon receiving a call, the voicemail service then processes the account code and transfers the call to the destination. In the case of location 110 or 120, when a user makes an account code call, the call is routed to the local account code extension on that user's voicemail server, e.g., server 118 for location 110 and server 127 for location 120.

The second remote location 130 illustrates a further aspect of the invention. As shown there, a relatively small number of users require only two switches to service the relatively small number of telephones at that location. Voicemail services for location 130 are provided by the voicemail server 127 at location 120. Thus, for location 130 the account code services are provided by server 127 at location 120.

The system illustrated also includes mechanism for overcoming failures of particular pieces of hardware. As mentioned, when a user makes an account code call, the call is routed to the local account code extension on the user's voicemail server. If the user is on a voicemail server or other apparatus and the voicemail server or other apparatus either does not service account code calls, or has failed (requiring repair), then the call is routed to the next server assigned to handle account code calls based on the site hierarchy as defined by the system administrator at initial configuration. That procedure defines the failover procedures for equipment in the system. For example, if a voicemail server 127 fails, calls requiring account code services from switches 121 or 122 can be forwarded to voicemail server 118. If there were a large enough number of failures, the failover process leads back to the headquarters voicemail server 118, which is often backed up by a backup server 114.

Of course, the organization or arrangement of servers and failover procedures does not necessarily need to lead to the headquarters server. The system administrator may determine that in configuring the system that a redundant server in the headquarters location is an unnecessary expense, or otherwise undesirable. In that case the administrator may define the procedure to failover to servers in some other manner, for example, to the closest location, or the location with the least load. Such a procedure or configuration also may be implemented "automatically" with the system itself programmed to failover to other servers in a sequence determined by an algorithm stored in the system itself.

A description of the architecture and hierarchy of a typical system such as described here may be found in U.S. Pat. No. 7,450,574, entitled "An IP Telephony Network Using a Configuration Map for Organizing Sites in a Tree-Like Hierarchy" and commonly assigned with this application to Shore-Tel, Inc. For a description of initiating a call and then providing an account code from a personal computer coupled to the system, see commonly assigned U.S. Pat. No. 7,450,703, entitled "Acceptance of Inputs from Various Interfaces to a Telephony System." Each of these documents is incorporated by reference herein.

In the case of a failover, the voicemail servers operate just as described above, i.e., monitoring the extensions to determine which calls require account code services, providing those services, and then transferring the call to the desired destination upon validation of the account codes.

Once the account code has been validated, the account code service sends information about the account code to the appropriate location as specified by the system administrator. For example, if a telephony management system or call data reporting have been implemented, the account code information is typically sent to one or the other of those.

Figure 2:
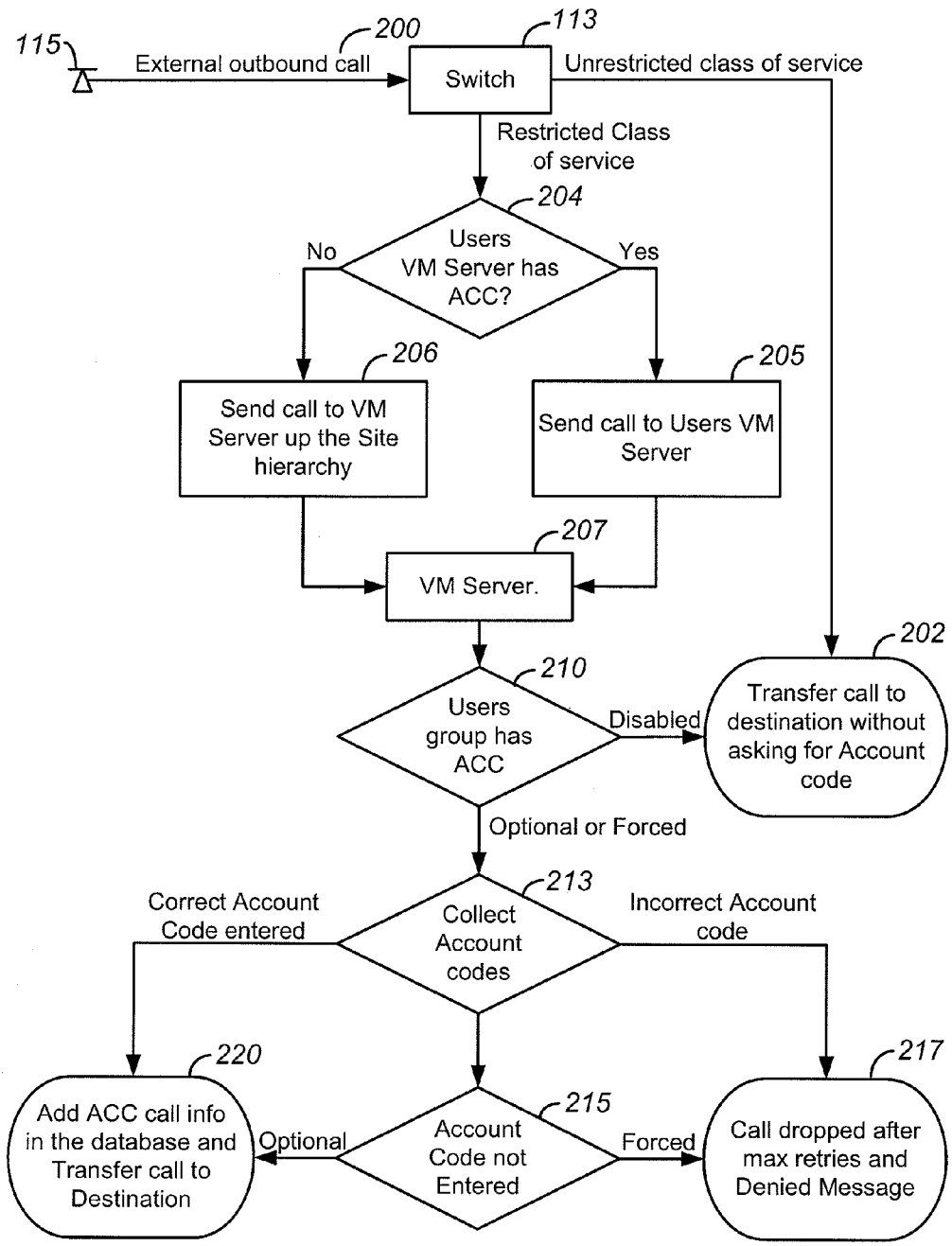
FIG. 2 is a flow chart illustrating handling of a call requiring an account code.

FIG. 2 is a flowchart illustrating one implementation of the manner in which account codes are handled by the distributed VoIP system. As shown, the process begins with an external outbound call 200 from a telephone 115. The call is received by a switch 113 such as shown in FIG. 1. If telephone 115 has an unrestricted class of service, then the call is immediately transferred to the destination without request for an account code, as shown by block 202. On the other hand, if telephone 115 has a restricted class of service, then a first test is made at step 204 to determine whether the user's voicemail server provides account code services. If it does, then the call is sent to the user's voicemail server as shown by block 205. If the user's voicemail server does not have account code services (or has failed), then as shown by the "no" arrow from block 204, then the call is sent to a voicemail server up the site hierarchy which does provide such services, as shown by blocks 206 and 207.

Next, a test is made at step 210 to determine whether the user group with which telephone 115 is associated has implemented the account code services. If they have been disabled, then control passes back to block 202, and the call is transferred to the destination without seeking the account code. On the other hand, if the account code is required, or optional, then at step 213 the account code is collected. As described above, typically the account code will be collected as a result of the user of telephone 115 entering a series of digits on the telephone 115, or entering information into a computer coupled to the telephone system. Either way, the information is collected and associated with telephone 115.

As also shown in FIG. 2, if the user does not enter the account code, as per block 215, and the code is required (forced), then the call is dropped after a specified number of re-tries, and a call denied message is presented to the user as shown by block 217. Similarly, if an incorrect account code is entered at step 213 some specified number of times, the same action occurs and the call is dropped.

If at either step 213 the correct account code is entered, or at step 215 an optional account code is entered, then as shown by block 220, the account code call information is entered into the database, and the call is transferred to the destination.

As described above, in the preferred embodiment the handling of account code calls has been distributed throughout a VoIP system by using the voicemail servers. Another way of distributing the account code calls includes distributing the account code calls by sending them to the server that handles account code calls which is geographically closest to the user initiating the call. Alternatively, system administrators can configure a primary and a backup account server for each group of users. This option allows the administrator to place users on account code servers while optimizing system traffic requirements.

While the present invention has been described in terms of specific embodiments, it will be apparent to those of skill in the art that the scope of the invention is not limited to the embodiments described above. Thus, the specification and drawings should be regarded as illustrative rather than restrictive. It should be apparent that modifications may be made without departing from the spirit or scope of the invention as set forth in the appended claims.

What is claimed is:

1. In a voice over internet protocol telephone system in which groups of users are supported by a first plurality voicemail servers which provide services related to voicemail, a method of handling telephone calls invoking a second plurality of account codes comprising:

distributing to the first plurality of voicemail servers, services for handling calls invoking the second plurality of account codes, different ones of the first plurality of voicemail servers handling different subsets of the second plurality of account codes, wherein the second plurality of account code provides accounting information for telephone calls made by the user and controls the user's ability to make telephone calls to a selected set of telephone numbers;

when a user of the groups of users makes a telephone call invoking an account code of the different subsets of the second plurality of account codes, determining if a voicemail server of the first plurality of voicemail servers for the user of the group of users has the services for handling calls with the account code invoked by the user;

if the voicemail server for the user has services for handling calls with the account code invoked by the user, then having the voicemail server handle the account code for the telephone call;

if the voicemail server for the user does not have services for handling calls with the account code invoked by the user, then transferring responsibility for handling the account code for the telephone call to another voicemail server in the first plurality of voicemail servers; and if there are no voicemail servers in the first plurality of voicemail servers which can handle the account code invoked by the user, then transferring responsibility for handling the account code for the telephone call to a headquarters server;

wherein when the telephone call invoking the account code is initiated, a switch in the telephone system routes the call to the voicemail server for the user to validate the account code and then transfers the telephone call to the desired destination; and wherein if the account code is validated, then information regarding the telephone call and the account code is sent to a management server.

2. A method as in claim 1 wherein without the account code at least some calls made by a user cannot be connected.

3. A method as in claim 1 wherein a system administrator configures the telephone system to define which voicemail servers support which groups of users.

4. In a voice over internet protocol telephone system in which groups of user telephones are coupled together by switches to switch telephone calls and by servers to provide information and services related to the telephone calls, the system implementing a method of handling telephone calls invoking account codes comprising:

assigning to each user telephone, a voicemail server from a first plurality of voicemail servers to provide voicemail services;

associating each of the plurality of voicemail servers with a group of users;

distributing to the plurality of voicemail servers services for handling calls invoking a second plurality of account codes, different ones of the first plurality of voicemail servers handling different subsets of the second plurality of account codes, wherein the second plurality of account code provides accounting information for telephone calls made by the user, and controls the user's ability to make telephone calls to a selected set of telephone numbers;

when a user of the group of users makes a call invoking an account code of the different subset of the second plurality of account codes, determining if a voicemail server of the first plurality of voicemail servers for the user of the group of users has services for handling calls with the account code invoked by the user;

if the voicemail server for the user has services for handling calls with the account code invoked by the user, then having the voicemail server handle the account code for the call;

if the voicemail server for the user does not have services for handling calls with the account code invoked by the user, then transferring responsibility for handling the account code for the call to another voicemail server in the first plurality voicemail servers; and if there are no voicemail servers in the first plurality of voicemail servers which can handle at least account code aspects of that call, then transferring responsibility for handling the account code for the call to a designated server among the first plurality of voicemail servers;

wherein when the telephone call invoking the account code is initiated, a switch in the telephone system routes the call to the voicemail server for the user to validate the account code and then transfers the telephone call to the desired destination;

wherein if the account code is validated, then information regarding the telephone call and the account code is sent to a management server.

5. A telephone system comprising:

at least one switch coupled to a plurality of telephones;

a plurality of account codes being associated with permitting telephone calls to be made using the plurality of telephones, wherein the plurality of account code provides accounting information for telephone calls made by the user and controls the user's ability to make telephone calls to a selected set of telephone numbers;

a plurality of voicemail server coupled to the at least one switch, at least one of the plurality of voicemail servers configured for providing some, but not all, of the plurality of account code services to the telephones connected to the at least one switch, different users of the telephones having different account code services associated with them based on the plurality of account codes associated with the different users of the telephones; and the at least one of the plurality of voicemail servers is initially configured to provide voicemail services for the different users of the telephones and to provide some, but not all, of the plurality of account code services for the different users of the telephones; and wherein if the at least one of the plurality of voicemail servers is not configured to provide the account code services associated with a particular user when requested, then the switch is configured to transfer telephone calls for the particular user to another voicemail server for the account code services associated with the particular user;

if there are no voicemail servers in the plurality of voicemail servers configured to provide the account code services, then the switch is configured to transfer responsibility for providing the account code services for the telephone call to a headquarters server;

in response to receiving the telephone call invoking the account code services, a switch in the telephone system routes the call to the at least one of the plurality of voicemail servers for the user to validate the plurality of account codes and then transfers the telephone call to the desired destination:

management server, coupled to the voicemail server, configured to receive information about account codes and the telephone calls in response to the at least one of the plurality of voicemail servers validating account code.

6. A system as in claim 5 wherein the at least one switch and the voicemail server are combined into a single unit.

7. In a voice over internet protocol telephone system in which groups of users are supported by a first plurality of service providers which provide services related to telephone operations, a method of handling telephone calls invoking a second plurality of account codes in which not all service providers are capable of handling calls invoking all of the second plurality of account codes, the method comprising:

distributing to the first plurality of service providers, services for handling calls invoking subsets of the second plurality of account codes, wherein the second plurality of account codes provides accounting information for telephone calls made by the user and controls the user's ability to make telephone calls to a selected set of telephone numbers;

when a user of the groups of users makes a telephone call invoking an account code of the second plurality of account codes, determining if the service provider for the group of users with which the user is associated has the services for handling calls with the account code invoked by the user;

if the service provider for the user has services for handling calls with the account code invoked by the user, then having the service provider handle the account code for the telephone call;

if the service provider for the user does not have services for handling calls with the account code invoked by the user, then transferring responsibility for handling the account code to another service provider in the first plurality of service provider; and if there are no service providers in the first plurality of service providers which can handle the account code for the telephone call, then transferring responsibility for handling the account code for the telephone call to a headquarters server;

wherein when the telephone call invoking the account code is initiated, a switch in the telephone system routes the call to the service provider for the user to validate the account code and then transfers the telephone call to the desired destination; and wherein if the account code is validated, then information regarding the telephone call and the account code is sent to a management server.

8. A method as in claim 7 wherein the service providers comprise switches.

9. A method as in claim 7 wherein the service providers comprise at least one of call processing servers, media gateways, and embedded servers.

10. A method as in claim 7 Wherein the telephone calls are distributed by sending them to the server that handles account code calls which is geographically closest to the user initiating the call.

11. A method as in claim 7 wherein the telephone calls are distributed by sending them to the server that handles account code calls which is a backup account server for that group of users.

12. A method as in claim 7 further comprising when a user makes a telephone call invoking an account code:

determining if the service provider for the group of users with which that user is associated which has the services for handling calls invoking account codes is operational; and if that service provider is not operational then performing a failover procedure to change the service provider for that group of users to a new service provider.

13. A method as in claim 12 wherein the failover procedure changes the service provider to another service provider in accordance with a procedure previously established for configuration of the voice over internet protocol telephone system.

14. A method as in claim 13 wherein the procedure previously established changes the service provider to be a service provider at a headquarters location.

15. A method as in claim 13 wherein the procedure previously established changes the service provider to be a different service provider in accordance with a previously defined algorithm.

* * * * *